United States Patent Office
2,938,884
Patented May 31, 1960

2,938,884

OXYPROPYLATION OF PHENOLIC RESINS

Diomed M. Chern, Midland, Mich., assignor to The Dow Chemical Company, Midland, Mich., a corporation of Delaware No Drawing. Filed Nov. 20, 1956, Ser. No. 623,298

4 Claims. (Cl. 260—58)

This invention relates to the reaction of propylene oxide with polyphenolic compounds and to the products thus produced. The polyphenolic compounds here contemplated are soluble phenolic condensates containing an average of at least 3 free phenolic hydroxyl groups per molecule, typified by the novolac resins wherein three or more molecules of a phenolic monomer are linked one to another through an aliphatic carbon atom derived from formaldehyde.

It is well known to react alkylene oxides, including propylene oxide, with phenolic resins of the above type. In such prior art, however, no method was available for causing the oxide to react quantitatively with the phenolic hydroxyl groups in such a way that each such hydroxyl group would react with one and only one propylene oxide molecule; that is, such that each phenolic oxygen atom has attached a single oxypropyl group:

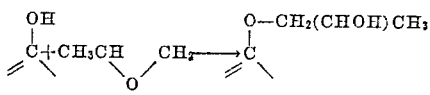

Heretofore, efforts to obtain such uniform mono-oxyalkylation have been confined to the use of substantially the stoichiometric amount of the oxide. While this yields a product having an average of one oxyalkylene group per phenolic hydroxyl group, the oxyalkylation is not uniform. Some phenolic hydroxyls react with more than one oxyalkylene molecule to form polyoxyalkylene ethers while others do not react at all. For many purposes, such a non-uniform product is undesirable.

It is among the objects of this invention to provide oxypropylated phenolic resins wherein substantially all phenolic hydroxyls have reacted with one and only one molecule of propylene oxide. Another object is to provide processes whereby such oxypropylated phenolic resins may be made.

According to the invention, phenolic resins having an average of at least 3 phenolic hydroxyl groups per molecule are reacted with propylene oxide in the presence of a trialkylamine wherein each alkyl radical contains 2 to 5 carbon atoms. This particular combination of oxide and catalyst appears to be unique in that reaction is readily achieved with phenolic hydroxyl groups but no reaction occurs with oxypropyl groups. Thus for the first time it is possible to treat a phenolic resin with an excess of propylene oxide, thus assuring that all phenolic hydroxyl groups react with the oxide, and yet have substantially no polyoxypropylene chains formed, and thus be able to recover substantially all the excess oxide.

The oxypropylated phenolic resins produced according to the invention have valuable properties that are critically different from such resins produced by previously known processes. One very important difference is their complete oxypropylation, that is, the absence of free phenolic hydroxyl groups. The usual chemical tests fail to show any free phenolic hydroxyl. This is very important if the resins are to be used to esterify drying oil acids in the production of varnish resins and similar surface coating materials because the presence of phenolic hydroxyls in such resins causes serious discoloration in the resin, particularly in aged coatings of the material. Another valuable property of the resins of the invention is the substantially complete absence of polyoxypropylene chains. In prior processes, in order to insure reaction with substantially all phenolic hydroxyl groups, it has been necessary to react substantially more than one equivalent of propylene oxide with the phenolic resin. This excess oxide has reacted with oxypropylene groups already in the resin to form polyoxypropylene chains. Such chains are highly undesirable in the resin if it is to be used to esterify drying oil acids to form surface coating resins because they greatly reduce the drying rate, hardness and durability of the coatings.

The process of the invention may be conducted in a suitable solvent or without solvent. Suitable solvents are those that dissolve the reactants and the product and are themselves inert in the process, such as dioxane, tetrahydrofuran, acetone and methyl ethyl ketone. The use of a solvent facilitates heat exchange and temperature control but involves the extra expense of solvent recovery.

The practice of the invention is illustrated by the following examples.

Example 1

A 1 liter pressure reactor was charged with 375 g. (3.6 eq.) of phenol-formaldehyde condensate (novolac resin) of softening point 104° C., 225 g. of methyl ethyl ketone and 3.75 g. of triethylamine. The reactor was then flushed with nitrogen, evacuated and heated to 140–50° C. with stirring. Propylene oxide (260 g., 4.5 mols, 25 percent excess) was then slowly added over a period of 1 hour, the temperature being maintained at 145°–150° C. and the pressure at 80–85 p.s.i.g. After the oxide had been added, the temperature was held at 140°–150° C. for an additional 2 hours, after which the reactor was cooled, the product was transferred to a glass resin kettle and the volatile materials were distilled to a final temperature of 160° C. at 5 mm. pressure. The solvent and excess oxide were thus recovered substantially quantitatively. Most of the amine catalyst was also recovered in the distillate.

The product was a substantially colorless, transparent resin with a softening point (bar) of 66° C. The yield was substantially quantitative.

The absence of phenolic hydroxyl groups was demonstrated by chemical and physical tests.

The product was esterified with an equal weight of dehydrated castor oil acid to yield a varnish-type resin which when dissolved in mineral spirits (70 percent solids) had Gardner 1 color, viscosity, Z–3, slide film color (Gardner 10 min., dry to touch and dry hard) 1–1–1, time for dry-to-touch, 1 hour, dry hard, 6 hours, resistance of baked film to 3 percent aqueous caustic, 15 days to failure. Films showed substantially no yellowing with age.

When the experiment of Example 1 was repeated, the only change being the substitution of sodium hydroxide for the triethylamine, substantially more than the theoretical amount of propylene oxide was consumed, yet a significant number of phenolic hydroxyl groups were found not to have reacted; the softening point of the oxypropylated resin was low (50° C.); the resin made from the product and dehydrated castor oil acid had higher color, higher viscosity and longer drying time, and films made therefrom were softer, weaker, had a much greater tendency to yellow on aging and had less resistance to alkali than did the product of Example 1.

When the triethylamine used as catalyst in the above example was replaced with tripropyl-, tributyl- or triamylamine substantially equivalent results were obtained. These higher amines are less satisfactory than triethylamine, however, because they are somewhat less active and, being less volatile, are not so easily distilled from the product. Trimethylamine was not operable in the process because it catalyzed repeated reaction of propylene oxide whereby polyoxypropylene chains were formed. Likewise, when ethylene oxide was used instead of propylene oxide, uncontrolled multiple reaction was obtained wherein polyoxyethylene chains were formed.

When the novolac resin used in Example 1 was replaced with novolacs of other molecular weights, substantially identical results were obtained. Similarly, other polyphenolic compounds could be used in the same way to obtain the same unique result, viz., each phenolic hydroxyl group would react with one, and only one, molecule of propylene oxide.

No special precautions or reaction conditions are required by the process of the invention, any conditions suitable for the conventional reaction of propylene oxide with polyphenolic compounds being suitable. Likewise, any polyphenolic compound suitable for the conventional reaction with propylene oxide may be used in practicing the invention. Novolacs derived from substituted phenols, such as alkylphenols, phenylphenol and the like are generally operable, as are those made with aldehydes other than formaldehyde, such as acetaldehyde, benzaldehyde, furfural and the like.

While the invention is operable with diphenolic compounds, and even with monophenols, the advantages of the invention are less important in the case of phenols of such low functionality because prior known processes yield products reasonably similar to those produced by the process of the invention.

I claim:

1. In a process for making a 2-hydroxypropyl ether of a soluble phenol-aldehyde novolac resin by the condensation of propylene oxide with said resin, the steps comprising conducting the condensation in the presence of a catalytic amount of a trialkylamine the alkyl groups of which each contains 2 to 5 carbon atoms.

2. A process as defined in claim 1 wherein the amine is triethylamine.

3. A process as defined in claim 1 wherein the resin contains an average of at least 3 phenolic hydroxyl groups.

4. A process as defined in claim 1 wherein the aldehyde is formaldehyde.

References Cited in the file of this patent

UNITED STATES PATENTS

| | | |
|---|---|---|
| Re. 23,851 | De Groote et al. | July 13, 1954 |
| 2,454,542 | Bock et al. | Nov. 23, 1948 |
| 2,548,447 | Shokal et al. | Apr. 10, 1951 |
| 2,683,130 | D'Alelio | July 6, 1954 |
| 2,717,885 | Greenlee | Sept. 13, 1955 |